(12) United States Patent
Suzuki (10) Patent No.: US 6,867,937 B2
(45) Date of Patent: Mar. 15, 2005

(54) SIGNAL TRANSMISSION APPARATUS AND SIGNAL REPRODUCTION APPARATUS USING A ROTARY TRANSFORMER

(75) Inventor: Kyoko Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 10/212,361

(22) Filed: Aug. 5, 2002

(65) Prior Publication Data

US 2003/0026027 A1 Feb. 6, 2003

(30) Foreign Application Priority Data

Aug. 3, 2001 (JP) .................................... P2001-236236

(51) Int. Cl.⁷ ................................................ G11B 5/09
(52) U.S. Cl. ............................ 360/46; 360/65; 360/68; 360/53; 360/281; 360/281.7
(58) Field of Search ............................. 360/46, 65, 66, 360/67, 68, 53, 108, 124, 281–281.7, 48, 29, 55, 62, 75, 64

(56) References Cited

U.S. PATENT DOCUMENTS

| 4,742,414 A | * | 5/1988 | Sakai et al. ............ 360/130.24 |
| 4,853,800 A | * | 8/1989 | Schulz ........................ 360/46 |
| 5,455,729 A | * | 10/1995 | Nelson et al. ........... 360/281.4 |
| 6,198,585 B1 | * | 3/2001 | Higurashi et al. ............ 360/48 |
| 6,304,397 B1 | * | 10/2001 | Ozue et al. .................. 360/29 |

FOREIGN PATENT DOCUMENTS

| JP | 04-341901 | * | 11/1992 |
| JP | 2000-322702 | * | 11/2000 |

* cited by examiner

*Primary Examiner*—Andrew L. Sniezek
*Assistant Examiner*—Natalia Figueroa
(74) *Attorney, Agent, or Firm*—Sonnenschein, Nath & Rosenthal LLP (57) ABSTRACT

The invention provides a signal transmission apparatus using a rotary transformer by which a wide bandwidth and a high transfer rate can be used without a significant increase of the cost. The signal transmission apparatus includes a transmission side circuit and a reception side circuit between which a rotary transformer is interposed. A passive element circuit including an inductance element is connected to an output stage of the rotary transformer in parallel to the transformer. The passive element circuit has an inductance value set substantially equal to or lower than an equivalent inductance value when the circuit of the rotary transformer side is viewed from the reception side circuit.

2 Claims, 6 Drawing Sheets

SIGNAL TRANSMISSION APPARATUS AND SIGNAL REPRODUCTION APPARATUS USING A ROTARY TRANSFORMER

RELATED APPLICATION DATA

The present invention claims priority to Japanese Application No. P2001-236236 filed Aug. 3, 2001, which applications incorporated herein by reference to the extent permitted by law.

BACKGROUND OF THE INVENTION

This invention relates to a technique for allowing a wide band and a high transfer rate to be used in a signal transmission apparatus and a signal reproduction apparatus in which a rotary transformer is used.

An apparatus is known which uses a rotary transformer as signal transmission means for transmitting a signal from a rotary system. For example, in a magnetic recording and/or reproduction apparatus in which a rotary head is used or a like apparatus, a rotary transformer is used in a circuit which transfers a reproduction signal from the rotor side to the stator side. In the circuit of the type described, the band is limited by the inductance of the magnetic head and the rotary transformer. In this regard, a reproduction amplifier is disposed on the stator side to improve the band characteristic.

The conventional circuit, however, has the following problem where it is tried to increase the bandwidth and the transfer rate.

In particular, the conventional circuit is disadvantageous in that, for example, where a magnetic resistive (MR) element is used as a head or in a like case, the bandwidth in reproduction is limited principally by the rotary transformer, more particularly by the inductance, coupling coefficient, floating capacitance and so forth of the rotary transformer.

In order to improve the rotary transformer, a method of raising the coupling coefficient of it, another method of decreasing the inductance of it and so forth can be used. However, for example, if it is tried to raise the coupling coefficient, then this has a bad influence in that the cost upon mass production rises. Therefore, the methods mentioned are restricted in improvement of the rotary transformer.

SUMMARY OF THE INVENTION

It is an object of the present invention to provide a signal transmission apparatus using a rotary transformer by which a wide bandwidth and a high transfer rate can be used without a significant increase of the cost.

In order to attain the object described above, according to an aspect of the present invention, there is provided a signal transmission apparatus in which a rotary transformer is used and a transmission circuit and a reception side circuit are connected to each other by means of the rotary transformer. A passive element circuit including an inductance element is connected to an output stage of the rotary transformer in parallel with the rotary transformer. An inductance value of the passive element circuit is set substantially equal to or lower than an equivalent inductance value when the circuit of the rotary transformer side is viewed from the reception side circuit.

With the signal transmission apparatus, since the passive element circuit including the inductance element is provided additionally to the output stage of the rotary transformer to broaden the band to the higher frequency side, a higher frequency signal (or signal component) can be transmitted, and consequently, a higher transfer rate of a system can be achieved. Besides, the effects just described can be achieved without the necessity to increase the coupling coefficient or decrease the inductance for the rotary transformer, but only it is necessary to additionally provide the passive element circuit described above. Therefore, no significant rise of the cost is involved. Naturally, also where a rotary transformer which is improved in terms of the coupling frequency or the inductance is used, there is an advantage that further increase of the bandwidth can be achieved if the configuration of the present invention is applied.

According to another aspect of the present invention, there is provided a signal reproduction apparatus in which a rotary transformer is used. The rotary transformer is interposed between a transmission side circuit and a reception side circuit. The transmission side circuit includes a reproduction head or a reproduction head and a reproduction amplifier provided on the rotor side. An output signal of the transmission side circuit is transmitted to the reception side circuit provided on the stator side through the rotary transformer. A passive element circuit including an inductance element is connected to an output stage of the rotary transformer in parallel with the rotary transformer. An inductance value of the passive element circuit is set substantially equal to or lower than an equivalent inductance value when the circuit of the rotary transformer side is viewed from the stator side.

With the signal reproduction apparatus, since the signal transmission apparatus described above is applied, it is possible to transmit a higher frequency signal than ever. Consequently, the signal reproduction apparatus can cope with recording of a higher density and so forth. Further, since the restriction to the bandwidth by the rotary transformer is moderated, the band of the reproduction system can be extended to the higher frequency side to sufficiently secure the reproduction band at a high transfer rate and reduce the error rate.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
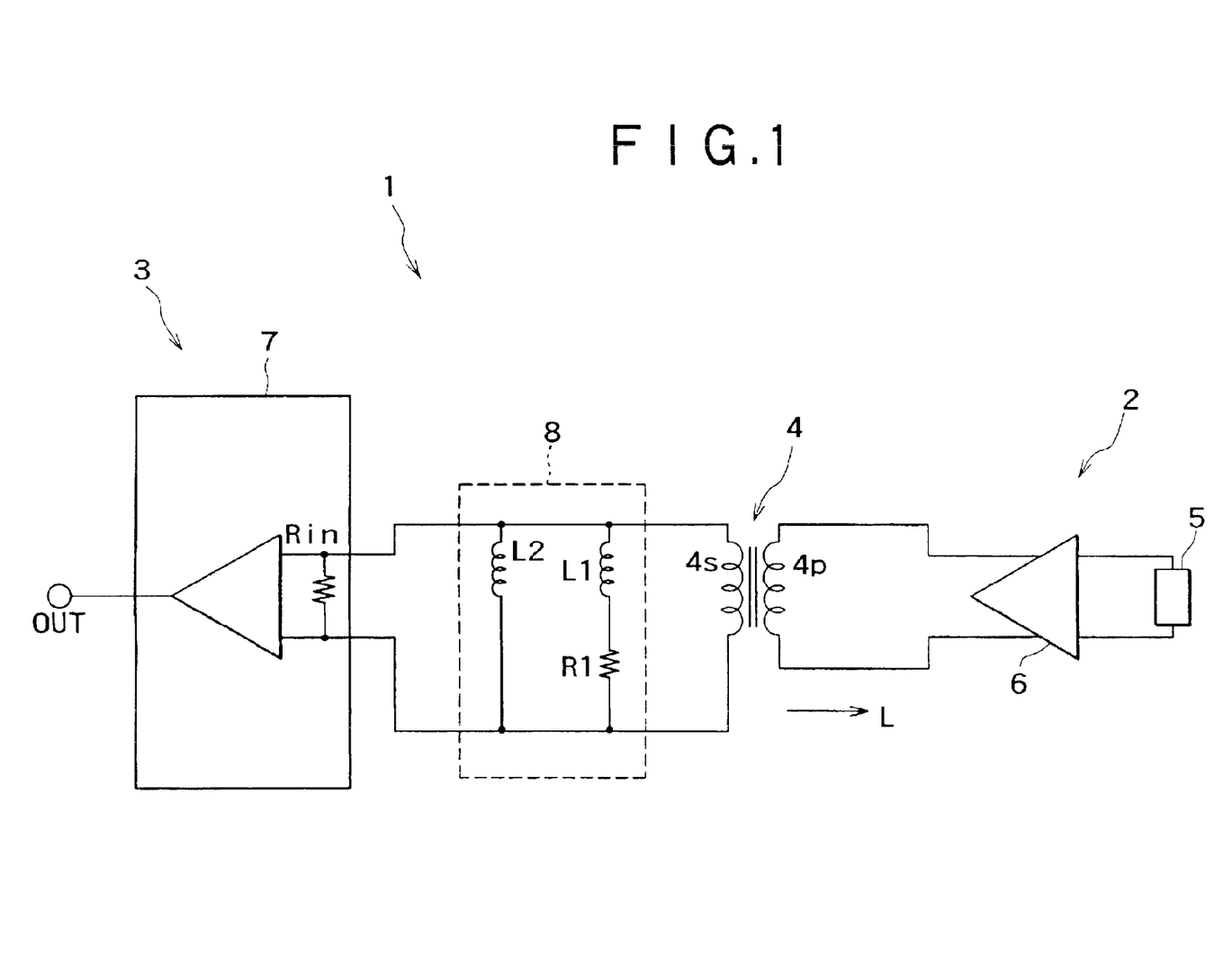
FIG. 1 is a circuit diagram showing a configuration of a signal transmission apparatus to which the present invention is applied.

Referring first to FIG. 1, there is shown a configuration of a signal transmission apparatus to which the present invention is applied. The signal transmission apparatus 1 shown includes a transmission side circuit 2 and a reception side circuit 3 connected, that is, electro-magnetically coupled, to each other by a rotary transformer 4.

It is to be noted that a rotary transformer is used typically, in a magnetic recording and/or reproduction apparatus in which a rotary head is used. Thus, the signal transmission apparatus 1 shown in FIG. 1 is formed as a circuit of a signal reproduction system of a magnetic recording and/or reproduction apparatus.

A reproduction head 5 and a reproduction amplifier 6 which compose the transmission side circuit 2 are provided on the rotor side such that an output signal of the reproduction amplifier 6 is transmitted to the reception side circuit 3 provided on the stator side through the rotary transformer 4. It is to be noted that the reproduction head 5 may be, for example, an MR element, a GMR (gigantic magnetic resistance) element, an inductive head or the like. Further, the reproduction amplifier 6 is a primary amplifier, and an output signal thereof is signaled as a primary input (refer to a winding 4p) to the rotary transformer 4.

A reproduction amplifier (secondary amplifier) 7 provided on the stator side forms part of the reception side circuit 3 and has a bandwidth of, for example, several tens MHz (megahertz) to one hundred MHz. An output signal of the reproduction amplifier 7 is transmitted to a signal processing circuit not shown from an "OUT" terminal of the signal transmission apparatus 1. It is to be noted that the resistance "Rin" shown in an input stage of the amplifier 7 represents an input impedance.

A passive element circuit 8 including an inductance element (inductor) is interposed between the output stage of the rotary transformer 4 and the reproduction amplifier 7. The passive element circuit 8 is connected in parallel to a secondary winding 4s of the rotary transformer 4 (with reference to the flow of a reproduction signal, and accordingly, the rotor side winding is the primary winding 4p). The passive element circuit 8 has an inductance value substantially equal to or lower than an equivalent inductance (denoted by "L" in FIG. 1) when the circuit positioned on the rotary transformer side is viewed from the reception side circuit 3, that is, from the stator side. It is to be noted that the rotary transformer 4 can be approximated to a T equivalent circuit, and the reproduction head 5 can be replaced substantially with an equivalent resistor. Therefore, a circuit simulation can be performed taking a floating capacitance, an output impedance of the amplifier and so forth into consideration.

The configuration of the passive element circuit 8 may be a configuration wherein a combination of an inductance element and a resistance element is used as a basic element, another configuration wherein only an inductance element is connected in parallel to the rotary transformer or a further configuration wherein the two configurations described above are combined with each other such as, for example, those described below.

(I) A configuration wherein a circuit including an inductance element L1 and a resistor R1 connected in series is used;

(II) Another configuration wherein an inductance element L2 is used; and (III) A further configuration wherein a circuit including an inductance element L1 and a resistor R1 connected in series and another inductance element L2 connected in parallel to the series circuit are used.

It is to be noted that, for the convenience of illustration, FIG. 1 shows the configurations (I) through (III) described above collectively and therefore shows the configuration (III) which is a combination of the configurations (I) and (II).

First, in the configuration (I), the series circuit of the inductance element L1 and the resistor R1 is provided at the output stage of the rotary transformer 4. Thus, the configuration (I) corresponds to the configuration of the signal transmission apparatus 1 of FIG. 1 which does not include the inductance element L2. In this instance, the inductance value of the inductance element L1 is set substantially equal to or lower than the value of the equivalent inductance L including the reproduction head. Since the bandwidth is widened to the higher frequency side due to an effect of improvement in impedance matching, also higher frequency components than those in the conventional circuit can be transmitted.

It is to be noted that, although the signal transmission apparatus 1 in FIG. 1 includes the single series circuit of the inductance element L1 and the resistor R1, it can be formed in various modified forms as required such as, for example, a form wherein a plurality of such series circuits are connected in parallel.

In the configuration (II), the passive element circuit 8 includes only the inductance element L2 in FIG. 1. With the configuration (II), a wider band than that of the configuration (I) can be used. However, since the transmission efficiency is deteriorated, for the inductance of the inductance element L2, it is necessary to take the allowance for loss of the equivalent inductance L as viewed from the reception side circuit 3 into consideration. It is to be noted that the configuration (II) can be used to transmit a signal having a particular basic frequency such as, for example, a clock signal and is particularly suitable for transmitting a signal having a high particular frequency.

In the configuration (III), the series circuit of the inductance element L1 and the resistor R1 of the configuration (I) and the inductance element L2 of the configuration (II) are connected in parallel as seen in FIG. 1. Thus, the configuration (III) exhibits the effects exhibited by both of the configurations (I) and (II).

It is to be noted that the configurations described above are mere possible examples of the configuration of the signal transmission apparatus 1, and in order to make the frequency characteristic appropriate, naturally such a suitable modification that, for example, a suitable element such as a resistor is connected additionally to the passive element circuit 8 may be applied to the configurations. Further, while, in the signal transmission apparatus 1 shown in FIG. 1, the reproduction amplifier 6 is provided on the rotor side, the present invention can be applied to various modified configurations such as, for example, a configuration wherein the reproduction amplifier 6 is provided otherwise on the stator side.

Figure 2:
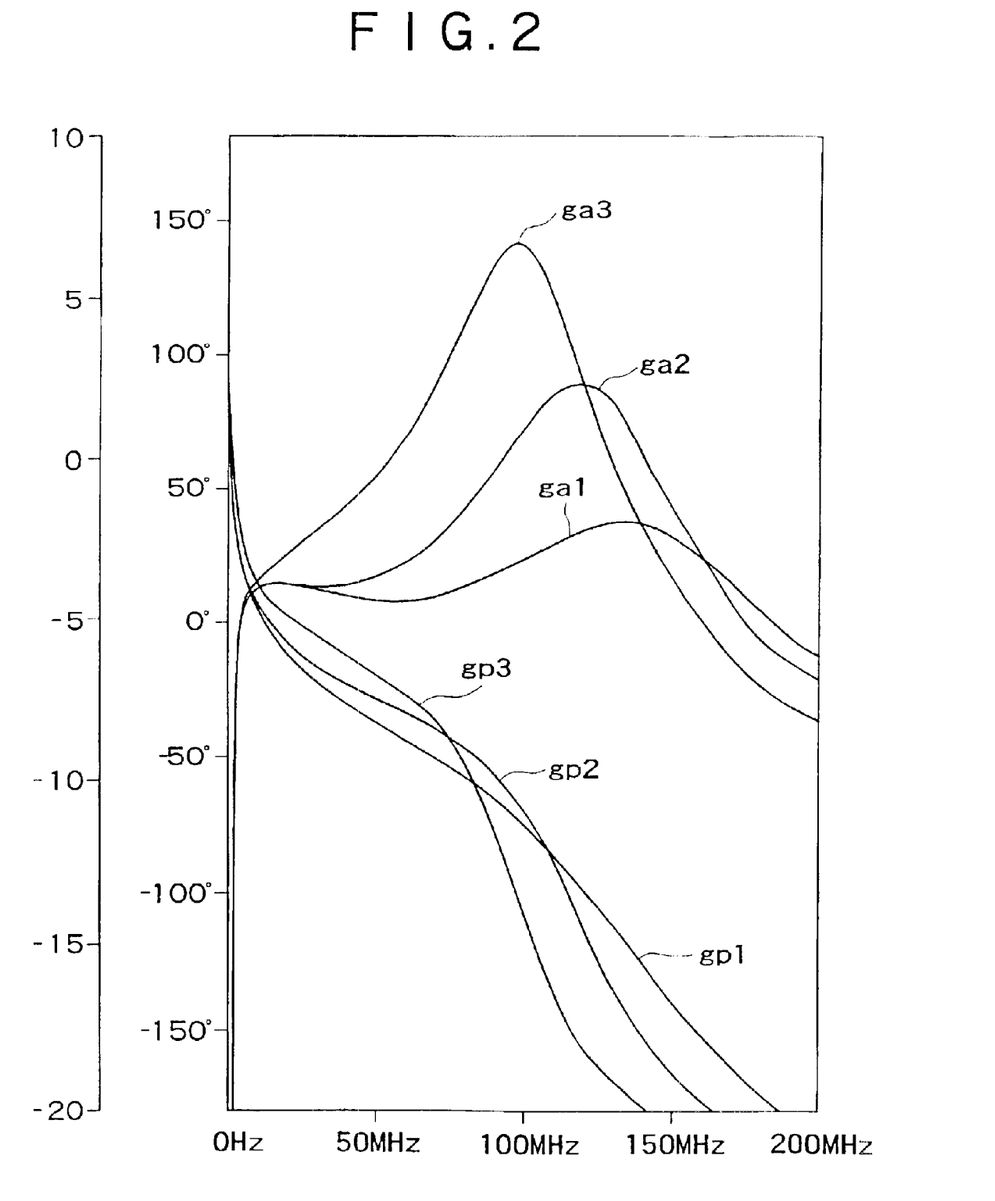
FIG. 2 is a diagram showing typical characteristics of the signal transmission apparatus where a circuit including an inductor and a resistor connected in series is provided at an output stage of a rotary transformer.
Figure 3:
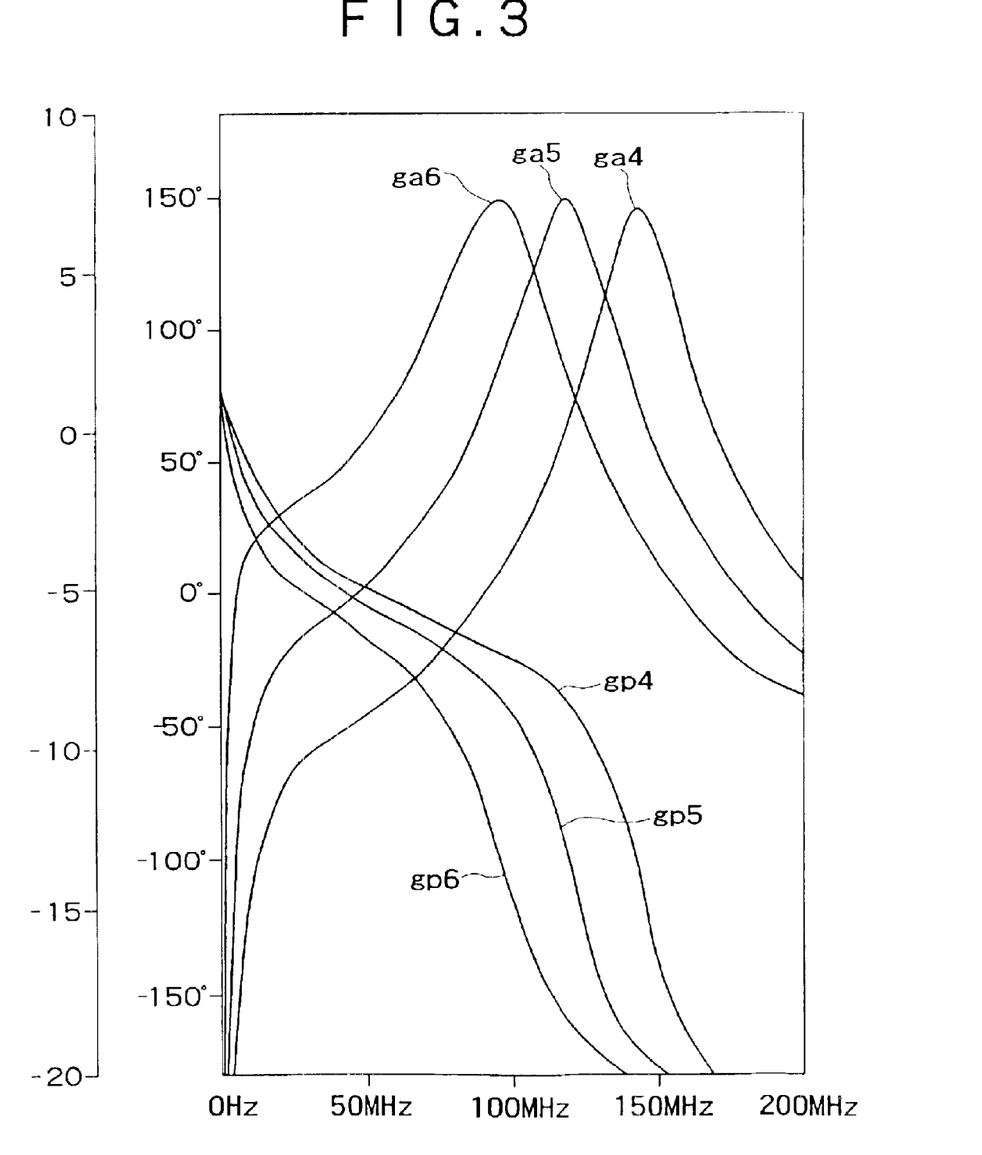
FIG. 3 is a diagram showing typical characteristics of the signal transmission apparatus where only an inductor is provided at the output stage of the rotary transformer.
Figure 4:
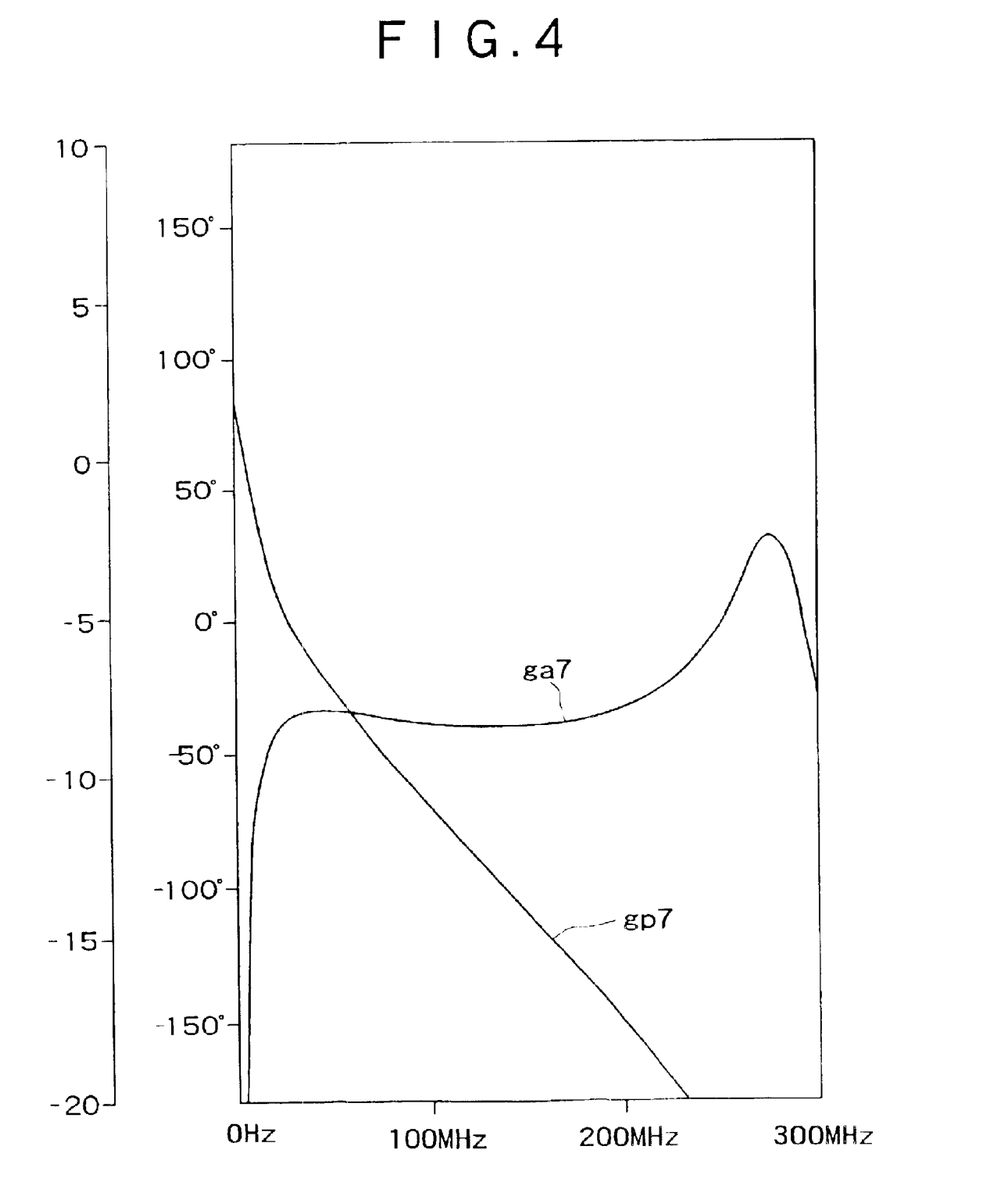
FIG. 4 is a diagram showing typical characteristics of the signal transmission apparatus where a circuit wherein a circuit including an inductor and a resistor connected in series and another inductor are connected in parallel to each other is provided at the output state of the rotary transformer.

FIGS. 2 to 4 show several examples of amplitude and phase characteristics. In FIGS. 2 to 4, the axis of abscissa indicates the frequency (unit: MHz) and the axis of ordinate indicates the amplitude level (dB) and the phase (.).

FIG. 2 shows an example of the characteristics regarding the configuration (I) described above. In FIG. 2, curves ga1 to ga3 indicate amplitude characteristics and curves gp1 to gp3 indicate phase characteristics.

In particular, the curve ga1 indicates the amplitude characteristic where the inductance of the inductance element L1 is lower than the equivalent inductance L regarding the rotary transformer.

The curve ga2 indicates the amplitude characteristic where the inductance of the inductance element L1 is substantially equal to the equivalent inductance L regarding the rotary transformer.

The curve ga3 indicates the amplitude characteristic where the inductance of the inductance element L1 is higher than the equivalent inductance L regarding the rotary transformer.

The curve gp1 indicates the phase characteristic where the inductance of the inductance element L1 is lower than the equivalent inductance L regarding the rotary transformer and corresponds to the case of the curve ga1.

The curve gp2 indicates the phase characteristic where the inductance of the inductance element L1 is substantially equal to the equivalent inductance L regarding the rotary transformer and corresponds to the case of the curve ga2.

The curve gp3 indicates the phase characteristic where the inductance of the inductance element L1 is higher than the equivalent inductance L regarding the rotary transformer and corresponds to the case of the curve ga3.

From FIG. 2, it can be seen that, as the inductance of the inductance element L1 decreases, the peak of the amplitude decreases and the band is broadened to the higher frequency side.

FIG. 3 shows an example of the characteristics regarding the configuration (II) described above. In FIG. 3, curves ga4 to ga6 indicate amplitude characteristics and curves gp4 to gp6 indicate phase characteristics.

In particular, the curve ga4 indicates the amplitude characteristic where the inductance of the inductance element L2 is lower than the equivalent inductance L regarding the rotary transformer.

The curve ga5 indicates the amplitude characteristic where the inductance of the inductance element L2 is substantially equal to the equivalent inductance L regarding the rotary transformer.

The curve ga6 indicates the amplitude characteristic where the inductance of the inductance element L2 is higher than the equivalent inductance L regarding the rotary transformer.

The curve gp4 indicates the phase characteristic where the inductance of the inductance element L2 is lower than the equivalent inductance L regarding the rotary transformer and corresponds to the case of the curve ga4.

The curve gp5 indicates the phase characteristic where the inductance of the inductance element L2 is substantially equal to the equivalent inductance L regarding the rotary transformer and corresponds to the case of the curve ga5.

The curve gp6 indicates the phase characteristic where the inductance of the inductance element L2 is higher than the equivalent inductance L regarding the rotary transformer and corresponds to the case of the curve ga6.

From FIG. 3, it can be seen that, as regards the amplitude, as the inductance of the inductance element L2 decreases, the peak is displaced to the higher frequency side while the height of the peak does not exhibit a great variation, but as regards the phase, it is displaced to the higher frequency side as the inductance of the inductance element L2 decreases.

FIG. 4 shows an example of the characteristics regarding the configuration (III) described above. In FIG. 4, a graph ga7 indicates the amplitude characteristic and another graph gp7 indicates the phase characteristic. It is to be noted that, in the present configuration (III), the inductance of the inductance element L2 is substantially equal to the equivalent inductance L regarding the rotary transformer while the inductance of the inductance element L1 is lower than the equivalent inductance L. Further, a peak of the amplitude can be seen at a frequency a little lower than 300 MHz.

Figure 5:
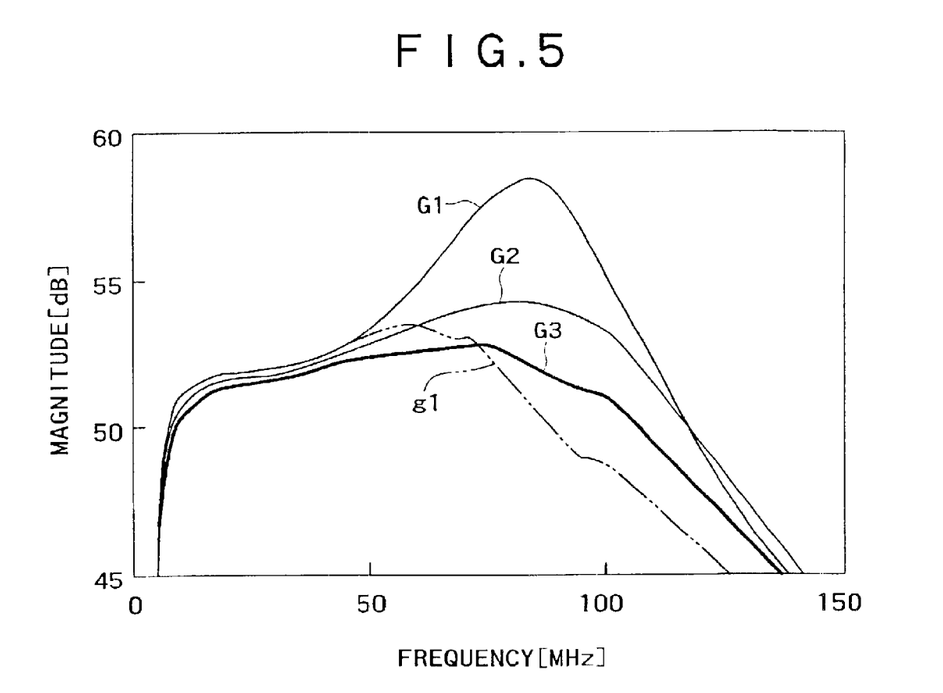
FIG. 5 is a diagram illustrating a circuit characteristic of the signal transmission apparatus of the present invention where it has a configuration (I) in comparison with a characteristic of a conventional circuit.

FIG. 5 shows an example of the output characteristics of the configuration (I) described above in comparison with that of a conventional signal transmission apparatus. In FIG. 5, the axis of abscissa indicates the frequency (unit: MHz) and the axis of ordinate indicates the amplitude level (unit: dB).

Curves G1 to G3 indicated by solid lines in FIG. 5 indicate characteristics where the inductance of the inductance element L1 is varied, and a curve g1 indicated by an alternate long and two short dashes line indicates the characteristic of the conventional circuit. From the comparison between the curves G1 to G3 and g1, it can be seen that characteristics indicated by the curves G1 to G3 extend to the higher frequency side.

Figure 6:
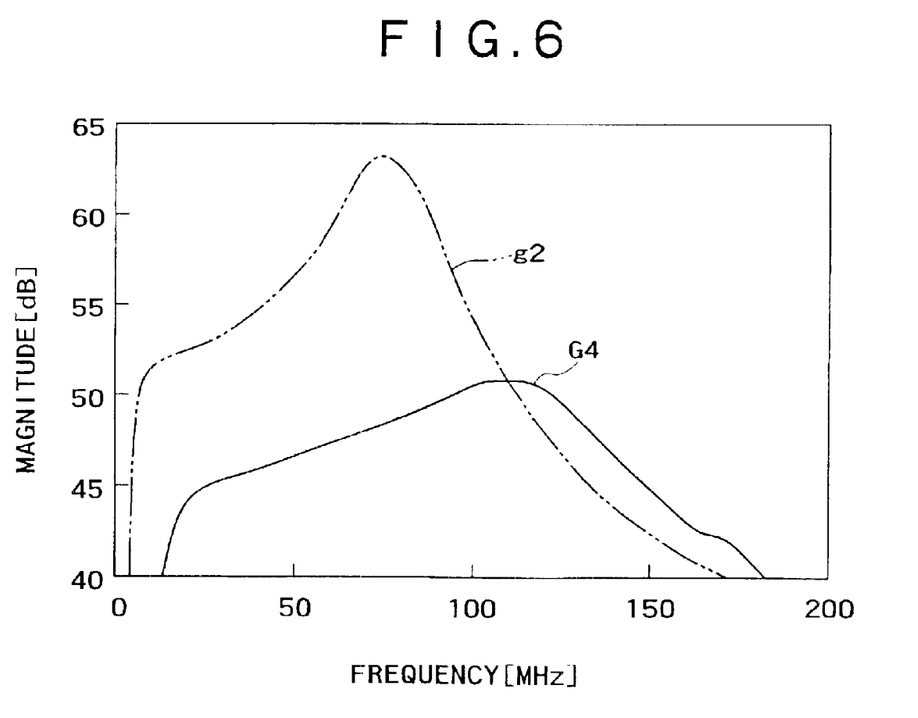
FIG. 6 is a diagram illustrating a circuit characteristic of the signal transmission apparatus of the present invention where it has a configuration (III) in comparison with a characteristic of a conventional circuit.

FIG. 6 shows an example of the output characteristic of the configuration (III) described above in comparison with that of the conventional circuit. In FIG. 6, the axis of abscissa indicates the frequency (unit: MHz) and the axis of ordinate indicates the amplitude level (unit: dB).

A curve G4 indicated by a solid line in FIG. 6 indicates the characteristic of the circuit according to the present invention and another curve g2 indicated by an alternate long and two short dashes line indicates the characteristic of the conventional circuit. From the comparison between the curves G4 and g2, it can be seen that the characteristic indicated by the curve G4 is extended to the higher frequency side.

While a preferred embodiment of the present invention has been described using specific terms, such description is for illustrative purposes only, and it is to be understood that changes and variations may be made without departing from the spirit or scope of the following claims.

What is claimed is:

1. A signal transmission apparatus in which a rotary transformer is used and a transmission side circuit and a reception side circuit are connected to each other by means of said rotary transformer, wherein said transmission side circuit includes a reproduction head and a reproduction amplifier provided on the rotor side;

a passive element circuit, which includes an inductance element and a resistor connected in series and a second inductance element connected in parallel with the inductance element and the resistor, is connected to an output stage of said rotary transformer in parallel with said rotary transformer; and an inductance value of said passive element circuit is set substantially equal to or lower than an equivalent inductance value when the circuit of said rotary transformer side is viewed from said reception side circuit.

2. A signal reproduction apparatus in which a rotary transformer is used, wherein a transmission side circuit and a reception side circuit are connected to each other by means of said rotary transformer;

said transmission side circuit includes a reproduction head and a reproduction amplifier provided on the rotor side;

an output signal of said transmission side circuit is transmitted to said reception side circuit provided on the stator side through said rotary transformer;

a passive element circuit, which includes an inductance element and a resistor connected in series and a second inductance element connected in parallel with the inductance element and the resistor, is connected to an output stage of said rotary transformer in parallel with said rotary transformer; and an inductance value of said passive element circuit is set substantially equal to or lower than an equivalent inductance value when the circuit of said rotary transformer side is viewed from said stator side circuit.

* * * * *